United States Patent [19]

Lubowitz

[11] 4,234,632
[45] Nov. 18, 1980

[54] SOLID WASTE ENCAPSULATION

[75] Inventor: Hyman R. Lubowitz, Hawthorne, Calif.

[73] Assignee: The United States of America as represented by the Administrator U.S. Environmental Protection Agency, Washington, D.C.

[21] Appl. No.: 909,892

[22] Filed: May 26, 1978

Related U.S. Application Data

[63] Continuation of Ser. No. 812,535, Jul. 5, 1977, abandoned, which is a continuation of Ser. No. 626,507, Oct. 28, 1975, abandoned.

[51] Int. Cl.$^3$ .............................................. B65D 71/00
[52] U.S. Cl. ......................................... 428/2; 264/8; 264/115; 264/126; 264/129; 427/221; 427/299; 427/386; 427/401; 427/421; 427/445; 427/385.5
[58] Field of Search ............... 427/401, 221, 222, 421, 427/445, 407, 322, 385 R, 299, 386; 264/8; 428/2

[56] References Cited

U.S. PATENT DOCUMENTS

| 3,027,249 | 3/1962 | Jost | 427/212 |
|---|---|---|---|
| 3,166,615 | 1/1965 | Farrell | 264/128 |
| 3,198,655 | 8/1965 | Gisiger | 427/212 |
| 3,330,088 | 1/1967 | Dunka | 428/2 |
| 3,451,185 | 6/1969 | Tezuka | 428/2 |
| 3,654,048 | 4/1972 | Bathgate | 428/2 |
| 3,664,076 | 5/1972 | McCoy et al. | 428/2 |
| 3,736,221 | 5/1973 | Evers et al. | 264/128 |
| 3,888,806 | 6/1975 | Kropecote | 264/128 |
| 4,013,616 | 3/1977 | Wallace | 428/2 |

*Primary Examiner*—Ronald H. Smith
*Assistant Examiner*—Janyce A. Bell

[57] ABSTRACT

Solid particulate waste material is coated with a thermosetting resin which is compressed and cured to form a rigid core. The rigid core is coated with a flexible thermoplastic resin to provide a sealed encapsulated waste agglomerate which can withstand moderate compressive loads.

8 Claims, 3 Drawing Figures

U.S. Patent  Nov. 18, 1980  4,234,632
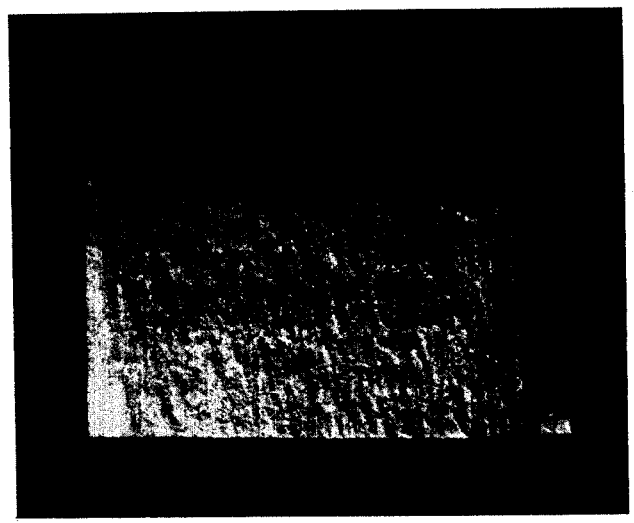

SOLID WASTE ENCAPSULATION

This is a continuation of application Ser. No. 812,535, filed July 5, 1977, now abandoned which is a continuation of application Ser. No. 626,507 filed Oct. 28, 1975, now abandoned.

BACKGROUND OF THE INVENTION

Industrial wastes which are not economical to recycle must be disposed into the environment. Some of these waste materials can be rendered harmless and then disposed in a convenient manner. Other wastes, such as heavy metals, for example, mercury, lead, antimony, arsenic, and radioactive substances, cannot be rendered harmless. Consequently, the disposal of these materials into the environment must be in a manner whereby they are passified, that is, they are localized and remain resistant to delocalization by ecological forces.

Currently, there are two methods for localizing wastes which cannot be decontaminated. One method is sealing the wastes into containers such as metal or plastic drums which are then stored underground or in the ocean. The other method is to incorporate the wastes into a matrix of materials, such as inorganic cements and polymers while in their fluid or molten state followed by solidification. The high viscosity of the molten plastics generally limited the quantity of waste that could be loaded into the plastic matrix. The incorporation method was limited also by the inability of the matrix to isolate the waste from the environment. Highly loaded matrices, that is, over 30 percent loadings, which were exposed to the environment were unsatisfactory because of leaching. Both of these methods present two critical disadvantages. One disadvantage is the ultimate tendency of the wastes to become delocalized, and the other is the increasing expense of providing systems with increasing assurance of long-term stability.

SUMMARY OF THE INVENTION

Hazardous wastes are stabilized by admixture into oligomeric or prepolymeric resins which are chain extended and cured into finished plastics, thereby yielding high solid content concentrate cores. The hazardous wastes may be either in the solid state or mixed with a liquid to form sludges, slurries, or slimes containing toxic compounds including arsenic, lead, mercury, selenium, beryllium, cadmium, zinc, chromium, copper, iron, calcium, cyanide, sulfate-sulfite, fluoride, and radioactive materials.

Dewatered sludges are coated with a thermosetting resinous material which are compressed in molds and are cured to form billets of agglomerates. The billets are coated with a thermoplastic resin to form a sealed encapsulation of the agglomerates. Solids loading of up to 96 percent by weight of waste material can be made without impairing the structural strength of the billets.

BRIEF DESCRIPTION OF THE DRAWING

The drawing is a photograph showing a cross-cut block of encapulsated waste.

DESCRIPTION OF THE PREFERRED EMBODIMENTS

Passivation of hazardous wastes is accomplished by a two-step method. In the first step, the waste is mixed with an unfinished prepolymer and cured to form an agglomerate core in a finished plastic matrix. In the second step, the agglomerate is jacketed with a flexible plastic to isolate the waste from the environment. The drawing shows the agglomerate core of hazardous waste and the protective jacket on three sides of the core.

Because of the wide variety of properties which can be formulated, hydrocarbon resins are the most suitable systems for localizing the wastes and protecting the environment. Non-polar hydrocarbon resins do not dissolve heavy metal wastes; accordingly, the chemical reactions and the rheological properties of the resins are not affected by the wastes. Generally, any thermosetting hydrocarbon homopolymer or copolymer derived from butadiene, styrene, isoprene, ethyleneoxide, propyleneoxide, butyleneoxide, epoxides, phenolics, melamines, vinyl halides, vinyl acetate, acrylics, or esters will be suitable.

Of the several thermosetting hydrocarbon resins suggested, the butadienes and copolymers thereof are preferred. These polybutadienes are preferred because they are readily available, relatively low cost, and easily workable. Particularly suitable for use as agglomerate binders was the high 1,2-atactic polybutadiene. The 1,2-atactic polybutadiene is liquid at working temperatures and polymerizes readily because of the high unsaturation.

Atactic 1,2-polybutadiene without chemically functional groups can be synthesized as polymers of relatively low molecular weight. These polymers are fluid when heated to temperatures of about 300° F., the temperature required to bring about rapid thermosetting of the resin. This fluid state contributes to resin drainage from the compacted waste in the course of transition to the agglomerated state. Consequently, the resulting agglomerates may not exhibit uniform distribution of waste in cross-section.

Two methods may be used to decrease the fluidity of the polybutadiene resins during thermosetting. One is to utilize the polybutadienes of substantially greater molecular weights. The other is to utilize polybutadienes of similar molecular weights which contain chemically functional terminal groups. The latter approach is advantageous in that it combines high fluidity at the time of initial resin coating of the waste with reduced fluidity during thermosetting.

Polybutadienes having carboxy, hydroxy, or mercapto functional groups are commercially available. If an epoxy resin is employed to control the viscosity, hydroxy or mercapto functional groups are not the most satisfactory to use because they are either unstable or do not readily react with the epoxy resins. Carboxy terminated groups are the preferred functional groups because they react with the epoxide resin to reduce fluidity during thermoset, and they are stable in air.

Epoxide resins can be added to carboxyl-terminated polybutadiene for viscosity control. Examples of a few epoxide resins which are suitable are:

epoxy novalacs
bis-epoxydicyclopentyl ether of ethylene glycol
epichlorohydrin/bis phenol A-type
1-epoxyethyl-3,4-epoxycyclohexane dicyclopentadiene dioxide
3,4-epoxy-6-methylcyclohexylmethyl-3,4-epoxymethyl-cyclohexane carboxylate
zeaxanthin diepoxide
bis(2,3-epoxypropoxy) benzene
1,2-epoxy-3-phenoxypropane These epoxide resins attach to the polybutadienes through the carboxyl terminal groups to increase the molecular weight of the prepolymer, thereby increasing the viscosity.

Further viscosity increase can be achieved by reacting the polybutadiene with a small amount of organic base to promote linear extension of the polymer chain through the carboxyl epoxy reaction. These bases are preferably polyamines having two or more amino or imine groups. Examples of suitable amines and imines are:

1,6-hexane-N,N'-diethylenimine
1,7-heptane-N,N'-diethylenimine
1,6-hexane-N,N'-dipropylenimine
1,7-heptane-N,N'-dipropylenimine
1,8-octane-N,N'-diethylenimine
1,8-octane-N,N'-dipropylenimine
para-phenylene diamine
meta-phenylene diamine
4,4'-diamino-diphenyl propane
4,4'-diamino-diphenyl methane benzidine
4,4'-diamino-diphenyl sulfide
4,4'-diamino-diphenyl sulfone
3,3'-diamino-diphenyl sulfone
4,4'-diamino-diphenyl ether
1,5-diamino-naphthalene
3,3'-dimethoxy benzidine
2,4-bis-(beta-amino-t-butyl)toluene
bis-(para-beta-amino-t-butyl-phenyl)ether
bis-(para-beta-methyl-delta-amino-pentyl) benzene
bis-para-(1,1-dimethyl-5-amino-pentyl) benzene
1-isopropyl-2,4-metaphenylene diamine
m-xylylene diamine
hexamethylene diamine
heptamethylene diamine
octamethylene diamine
nonamethylene diamine
decamethylene diamine
diamino-propyltetramethylene diamine
3-methylheptamethylene diamine
4,4-dimethylheptamethylene diamine
2,11-diamino-dodecane
1,2-bis-(3-amino-propoxy)ethane
2,2-dimethyl propylene diamine
3-methoxy-hexamethylene diamine
3,3'-dimethyl benzidine
2,5-dimethylhexamethylene diamine
2,5-dimethylheptamethylene diamine
5-methyl-nonamethylene diamine
2,17-diamino-eicosadecane
1,4-diamino-cyclohexane
1,10-diamino-1,10-dimethyldecane
1,12-diamino-octadecane.
Triamines such as
1,3,5-triaminobenzene
2,4,6-triamino-s-triazine
1,2,3-triaminopropane
4,4',4''-triaminotriphenyl methane
4,4',4''-triaminotriphenylcarbinol Jacketing or encapsulation of the agglomerated waste resin core with a layer of coating resin is designed to separate the core content from environmental forces which might disperse the toxic components into the environment. Three resins which are suitable for jacketing are polyvinyl chloride plastisols, polybutadiene modified epoxides, or polyethylene resins treated with polybutadiene resins. Of these three jacketing materials, the polyethylene resins treated with polybutadiene were desirable because they offered the best properties to cost for most of the applications.

Jacketing thicknesses can vary over a considerable range. Generally, a thickness of about ¼-inch is preferred, greater thicknesses being uneconomical and lesser thicknesses providing insufficient protection under conditions of compression and puncture.

Preparation of the waste-resin core is effected by mixing about 1 percent to 10 percent by weight thermosetting resin in solution with particulate waste residue. The thermosetting resin coats the residue and upon evaporation of the solvent from the solution, a free-flowing non-dusting powder is formed. The free-flowing powder is placed in a mold and cured by the application of heat and pressure. Cure times are dependent upon the temperature used and the size of the waste-resin billet. Complete cure is effected when the center of the billet reaches 300° F. For example, where the billet weighs one-ton and the mold temperature is 400° F., it requires about 17 hours for the center of the billet to reach 300° F.

The waste-resin core is jacketed by placing the core in a mold slightly larger than the mold used for making the core and pouring a thermoplastic resin in the void between the core and the mold wall. Sufficient thermoplastic resin is poured into the mold to cover the top of the core with a thickness of resin equivalent to the sides in the mold, giving a uniform jacket on five sides. After the thermoplastic coating is cured, the billet is removed from the mold and turned so that the sixth side can be coated in the previous manner.

It should be understood that the foregoing embodiment is merely one way of achieving a uniform jacket on the waste core, but is not intended to be limiting.

In order that the invention can be better understood, the following examples are set forth to show the steps by which the invention is carried out.

EXAMPLE I

Agglomerate Core Preparation

Into a two-gallon Hobart Mixure containing 160 grams of 28 mesh hazardous waste was poured an acetone solution containing 6.4 grams of resin in 32 grams of acetone. The resin composition was comprised from the following:

|  | Parts by Weight |
| --- | --- |
| Carboxyl terminated 1,2-polybutadiene 1,000 mol. wt. ("Hystl Cl,1000")[a] | 100 |
| Epoxy resin ("Epon 828")[b] | 21 |
| Dicumyl peroxide (Di-Cup R)[c] | 5.1 |
| Benzyl dimethylamine (BDMA)[d] | 0.6 |

[a] Distributed by Dynachem Corp., Santa Fe Springs, California
[b] Bisphenol A-Epichlorophydrin, Shell Chemical Corp.
[c] Hercules Inc., Chemical Department
[d] General Mills Chemical Co., or Mobay Chemical Corp.

A homogeneous mixture was obtained upon blending for about five-minutes. After the blending was completed, the material was exposed to the air for about two-hours to allow evaporation of the acetone solvent whereby a free-flowing particulate was formed. The particulate was poured into a mold and a pressure of 100 psi was applied simultaneously while the mold was heated in a temperature of 400° F. for about 30-minutes. An agglomerate having a hardness greater than Shore A 100 was formed.

EXAMPLE II

Jacket Fabrication

The agglomerate core prepared in Example I is placed in a mold having dimensions at least ½-inch larger than the core size. The core is positioned in the center of the mold and powdered polyethylene is poured into the space between the core and the mold. The mold is closed and a pressure of 100 psi is applied simultaneously while the mold is heated at a temperature of 350° F. for about 15-minutes. Upon completion of the cure of the polyethylene, the partially jacketed core is removed from the mold and inverted in the mold to apply the polyethylene to the uncoated side of the core which was on the bottom. Powdered polyethylene is poured over the surface of the exposed cure and cured in the manner previously described, forming a completely encapsulated waste-resin core.

Hazardous waste encapsulated in this manner has the following mechanical properties:

| Sample | No. of Specimens | Compressive Strength psi | Failure of Mode |
|---|---|---|---|
| Core block | 3 | 210 (81) | Fracture of block |
| Jacketed block | 3 | 1523 (87) | Distortion of jacket |

Standard deviations are given in parentheses.

Three specimens of mixed hazardous waste material were fabricated into consolidated core blocks and jacket as described. The polyethylene jacketing was machined from the cores to provide specimens which show core compressive strengths after jacketing has been carried out. The resulting blocks were tested using a "Cal-Tester" machine adapted with a compression fixture. The blocks were compressed at a loading rate of 0.05 inch/minute. The blocks had an average compressive strength to fracture of 210 psi. Initially, the fracture occurred along a line parallel to the compressive stress direction and then spread to cause failure of the entire block. Standard deviation values were high due to difficulty in machining all of the polyethylene jackets from the core blocks.

Jacketed samples were tested using a "Reihle" testing machine with a deflectometer to measure crosshead travel. The loading rate was 0.050 inch/minute. A linear load-deflection trace was obtained to approximately 13,000 pounds load, at which point the specimen deformed in compression. The sample compressed without failure approximately 10 percent of its initial height, then fracture occurred along the vertical edges in the direction of applied load. The average compressive strength of the jacketed blocks at rupture was 1523 psi. Thus, the jacket contributes approximately 80 percent of the strength of the encapsulated block. The polyethylene jacketing material flows into the core block in the coating operation to a depth of 0.05 to 0.1 inch and increases the strength of the core/jacket by providing uniform stress transfer to the core in compression testing. The unbounded core/jacket interface allows side wall buckling of the jacket at lower stress levels and results in core fracture at significantly lower stress.

Freeze-thaw tests were conducted to determine the ability of the jacketed blocks to withstand thermal cycling in a land-fill environment. The test conducted was a modification of ASTM-C666-71 and consisted of thermal cycling of the jacketed blocks alternately in a −10° C. salt/ice bath and 100° C. boiling water. The cycles were of 15-minute duration, i.e., 16 full cycles per day, with the blocks being stored in a freezer during overnight periods. The tests were continued for 75 half-cycle temperature changes and both jacketed blocks and core blocks were prepared and tested for ultimate compression strength as discussed previously. The ultimate compression strength to block fracture of the core block was 208 psi. Ultimate compression strength of the jacketed blocks occurred at approximately 10 percent decrease in specimen height and the block split at its vertical edges in the direction of applied load at 1335 psi.

Impact strength was measured by a drop test for cubic specimens which was a minor modification of ASTM-D997-50-71, Impact Strength of Cylindrical Shipping Containers. The specimens were dropped onto a steel plate 50 times from a height of 6 feet, followed by 15 drops from 10 feet. The impact from 6 feet did no visible damage to the specimen and the 10 foot drop impact resulted in maring of the surface of the specimen and deformation of the corners, but did not result in fracture of the jacket.

Resistance of the polyethylene jacket to puncture by sharp objects was measured by attaching a 30° pointed tip fixture onto the compression fixture on the "Cal-Tester" machine. A loading rate of 0.05 inch/minute was applied, and a force of 700 pounds was required to penetrate the ¼-inch polyethylene jacket of the core. The jacketing deformed plastically and did not show any fracture or crazing in the vicinity of the puncture.

Environmental leaching studies were conducted by exposing 16 blocks of encapsulated heavy metal waste to 8 aqueous solutions, distilled water, 10 percent ammonium sulfide, 1.5 N hydrochloric acid, 0.1 N citric acid, 1.25 N sodium hydroxide, 0.1 N ammonium hydroxide, simulated ocean solution, and 10 percent dioxane. The solutions were sampled after 1, 2, 5, 10, 20, 30, 45, 60, 90, and 120 days, and concentration determinations of heavy metals were made using a Jarrell-Ash 810 Atomic Absorption Spectrophotometer. No definite trend of increasing concentrations of heavy metals of any of the monitored wastes was noted in any of the leaching baths. It was concluded that the resin jacket maintained essentially equal effectiveness in retaining heavy metal contaminants under a broad range of leaching conditions.

I claim:
1. A process for the passivation of soluble waste by liquid impervious encapsulation comprising:
    (A) mixing solid particulate waste, which is soluble in aqueous solutions, including water per se, with a thermosetting resin to form resin coated waste particles;
    (B) compacting and curing said coated particles to form a hard, filed resin aggregate; and
    (C) completely coating said aggregate with a layer at least about ¼" thick of a fused, flexible, liquid impervious thermoplastic resin to form a rigid, liquid impervious encapsulated block.
2. A process according to claim 1 wherein:
    said solid waste is selected from the group consisting of compounds of lead, chromium, cadmium, cyanide, copper, zinc, calcium, iron, mercury, fluoride, and sulfate-sulfite.
3. A process according to claim 1 wherein:
    said thermosetting resin is selected from the group consisting of polybutadiene, polyisoprene, polysty- rene, polyethyleneoxide, polypropyleneoxide, polybutyleneoxide, epoxy, phenolic, melamine, acrylic, polyvinylhalide, polyvinylacetate, and copolymers thereof.

4. A process according to claim 1 wherein:
said flexible thermoplastic resin coating is selected from the group consisting of polyethylene, polypropylene, styrenated polybutadiene, styrenated polyisoprene, styrenated polyesters, polyvinylchloride, and plastisols thereof.

5. A process according to claim 2 wherein:
(A) said thermosetting resin is selected from the group consisting of polybutadiene, ployisoprene, polystyrene, polyethyleneoxide, polypropyleneoxide, polybutyleneoxide, epoxy, phenolic, melamine, acrylic, polyvinylhalide, polyvinylacetate, and copolymers thereof; and
(B) said flexible thermoplastic resin coating is selected from the group consisting of polyethylene, polypropylene, styrenated polybutdiene, styrenated polyisoprene, styrenated polyesters, polyvinylchloride, and plastisols thereof.

6. A process for isolating soluble solid waste from ecological forces such as water, pressure of overlying materials, and the like, comprising:
(A) mixing solid particulate waste selected from the group consisting of compounds of lead, chromium, cadmium, copper, zinc, calcium, iron, mercury, fluoride, and sulfate-sulfite, with about 1 to 10 percent by weight thermosetting resin in a solvent solution, and permitting the solvent to evaporate thereby forming a free-flowing powder;
(B) placing the free-flowing powder in a mold and curing the powder by application of heat and pressure thereto, thereby forming a hard, filled resin, compacted aggregate;
(C) completely coating said compacted aggregate with a tough, flexible, liquid impervious thermoplastic resin layer about at least $\frac{1}{4}''$ thick;
(D) whereby the aggregate is encapsulated in a liquid impervious casing.

7. A process according to claim 6 wherein:
(A) said thermosetting resin is selected from the group consisting of polybutadiene, polyisoprene, polystyrene, polyethyleneoxide, polypropyleneoxide, polybutyleneoxide, epoxy, phenolic, melamine, acrylic, polyvinylhalide, polyvinylacetate, and copolymers thereof; and
(B) said flexible thermoplastic resin coating is selected from the group consisting of polyethylene, polypropylene, styrenated polybutadiene, styrenated polyisoprene, styrenated polyesters, polyvinylchloride, and plastisols thereof.

8. The product produced by the process of either claim 6 or 7.

* * * * *